Figure 1:
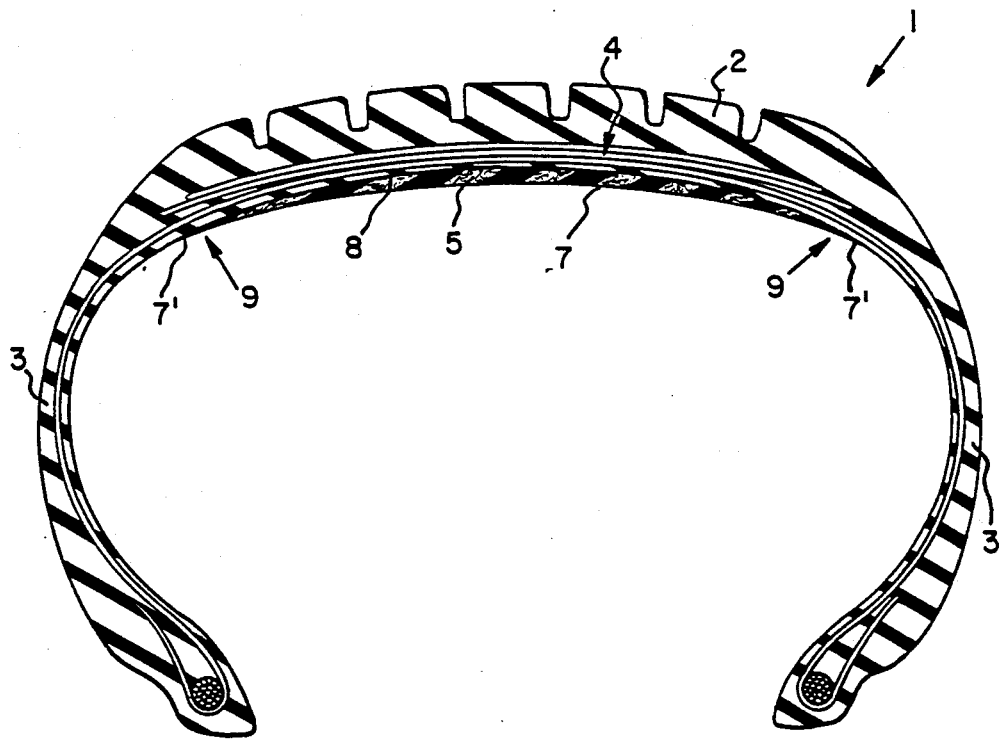

United States Patent [19]
Dobson

[11] Patent Number: 4,919,183
[45] Date of Patent: Apr. 24, 1990

[54] SELF SEALING PNEUMATIC TIRE

[75] Inventor: Robert L. Dobson, Tallmadge, Ohio

[73] Assignee: The Goodyear Tire & Rubber Company, Akron, Ohio

[21] Appl. No.: 747,538

[22] Filed: Jun. 21, 1985

Related U.S. Application Data

[63] Continuation of Ser. No. 536,480, Sep. 28, 1983, abandoned.

[51] Int. Cl.⁵ .............................................. B60C 21/08
[52] U.S. Cl. ..................................... 152/502; 152/503
[58] Field of Search ............................... 152/502–507, 152/521, 516; 156/115; 428/912; 106/33

[56] References Cited

U.S. PATENT DOCUMENTS

| | | | |
|---|---|---|---|
| 2,632,492 | 3/1953 | Placentino | 156/115 |
| 4,163,467 | 8/1979 | Dobson | 106/33 |
| 4,186,042 | 1/1980 | Powell et al. | 152/347 |
| 4,228,839 | 10/1980 | Böhm et al. | 152/347 |
| 4,282,052 | 8/1981 | Dobson | 106/33 |
| 4,287,928 | 9/1981 | Hallman | 152/347 |
| 4,359,078 | 11/1982 | Egan | 152/347 |

FOREIGN PATENT DOCUMENTS

| | | | |
|---|---|---|---|
| 54-6206 | 1/1979 | Japan | 156/115 |
| 26075 | of 1897 | United Kingdom | 152/347 |
| 255757 | 7/1926 | United Kingdom | 152/347 |

Primary Examiner—Michael W. Ball
Attorney, Agent, or Firm—Henry C. Young, Jr.

[57] ABSTRACT

Pneumatic rubber tire with a puncture sealing feature comprised of an enveloped open network structure containing a sealant composition on the inner portion of the tire.

12 Claims, 1 Drawing Sheet

SELF SEALING PNEUMATIC TIRE

This is a continuation of application Ser. No. 536,480, filed on Sept. 28, 1983, now abandoned.

FIELD

This invention relates to a pneumatic tire having an ability to seal against puncturing objects. The invention more particularly relates to a pneumatic tire having a network structure containing a sealing composition on its inner surface.

BACKGROUND

For safety, a pneumatic tire has historically been sought which has a means of retarding or preventing its deflation upon being punctured. Many methods and tire constructions have been suggested and used for this purpose for ordinary passenger vehicles such as automobiles which are to be driven over typical roadways.

It is an aspect of this invention to provide a pneumatic tire which has an ability to seal against various puncturing objects.

DISCLOSURE AND PRACTICE OF THE INVENTION

In accordance with this invention, a pneumatic rubber tire is provided having a composite of open network structure containing a sealant composition adhered to the inner liner of said tire, where said composite is enveloped by the said inner liner of the tire and an outer, overlaying rubber coverstrip and is comprised of (A) a three-dimensional, open network of spaced apart filamentary elements in the form of a skeletal structure comprised of (i) resilient, flexible, open cell foam, or (ii) three dimensional mat of flexible organic polymer filaments which are woven or non-woven and are bonded at least 80% of their crossings and (B) a sealant composition contained in said skeletal structure, where said coverstrip covers the outer surface of said composite and its two edge portions are integral, covulcanized and terminate with said tire inner surface; wherein said open cell foam is composed of a flexible, resilient material selected from at least one of natural rubber, synthetic rubber and polyurethane; where the filaments of said mat are composed of a flexible organic thermoset polymer or thermoplastic polymer having a softening point of at least 200° C.; and where said sealant composite is a tacky composition comprised of (i) about 100 parts by weight of a rubber selected from uncured cis 1,4-polyisoprene rubber or partially cross-linked butyl rubber, (ii) about 40 to about 300, preferably about 150 to about 250, phr of fluid polymeric material selected from at least one of rubber processing oil and polybutene having a viscosity in the range of about 25 to about 5000, preferably about 50 to about 4500, centistokes at 100° C., (iii) when (i) is butyl rubber, about 40 to about 300, preferably about 150 to about 250 phr of polyisobutylene having a viscosity average weight in the range of about 8000 to about 135,000 preferably about 8000 to about 12,000 (Staudinger), (iv) about 40 to about 140 preferably about 80 to about 100 phr of at least one of the group consisting of particulate carbon black and clay and (v) about 40 to about 120, preferably about 80 to about 100, phr of a tackifying resin.

The inner liner of the tire refers to what conventionally has heretofore constituted the inner surface of the tire typically as a gum strip of rubber which has usually been the first tire component applied to a tire building drum in a tire building process. The inner liner generally performs the function as an air barrier between the tire's inner air chamber and the body of the tire.

Thus, in further accordance with this invention a pneumatic tire is provided having two spaced inextensible beads, a tread portion, a pair of individual sidewalls extending radially inward from the axial outer edges of said tread portion to join the respective beads, a supporting structure for said tread portion and said enveloped composite adhered to and disposed inwardly of said supporting structure in the crown region of the tire.

In the practice of this invention, it is preferred that, for the open network skeletal structure, the open cells of the foam have an average diameter in the range of about 0.05 (0.13) to about 0.25 (0.6), and preferably about 0.1 (0.25) to about 0.2 (0.5), inch (cm). The open cell foam can be prepared by various methods, such as methods known to those having skill in the art, such as during the cell formation process or by reticulating a closed cell foam. In a closed cell foam, at least about 70, usually about 70 to about 90 or more, percent of the cells are open with the remainder being closed cells.

The three-dimensional mat can be composed of various polymer filaments such as, for example, polyester, nylon and aramid filaments. In order that the mat have dimensional stability, or dimensional integrity, the filaments are bonded at their crossings. Such bonding can be accomplished by various methods known to those having skill in the art such as adhesive bonding, by fusion or by bonding during a filament formation or preparation process.

The composite of structure and sealant is enveloped by the tire's rubber inner liner and a rubber coverstrip. Such cover strip also aids the tire building process by being applied against the tire building drum thereby preventing the sticky composite itself from sticking to the building drum.

In such process, a method of building a tire comprises first preparing a laminate of said composite adhered to said coverstrip with the edge portions of said coverstrip extending outwardly from said composite, applying said laminate to a tire building drum with the coverstrip adjacent to the drum, building the tire's rubber inner rubber liner over the laminate followed by the remainder of the tire components: removing the tire from the drum and submitting the tire to a shaping and curing process under conditions of heat and pressure during which said coverstrip edge portions are terminated and covulcanized with said tire inner surface to form an integral structure.

During the curing process, it is understood that the composite itself does not undergo a curing step but remains in substantially the state in which the laminate was prepared. Thus, it is intended that it is the coverstrip which co-cures with the tire's inner surface.

Optionally, the extended edges of the cover strip in the laminate can be folded around the edges and over a portion of the opposing surface of the composite prior to application to the building drum.

The coverstrip can be of various rubbers and, although the selection of rubbers is not considered as being critical, it is preferred that the rubber be compounded to provide a rubber having a low modulus and an ultimate elongation (before breaking) of at least about 500 percent so that the puncturing object can penetrate the coverstrip with minimal deformation of the strip itself. Representative of various rubbers are natural rubber and synthetic rubbers such as cis 1,4 polyisoprene, cis 1,4-polybutadiene, styrene/butadiene copolymer, butyl rubber, chlorobutyl rubber, bromobutyl rubber, EPDM (ethylene/propylene/conjugated diene terpolymer) and styrene/butadiene/styrene block copolymer.

Although the thickness of the coverstrip is not critical, it is preferred that it is relatively thin because it is not considered as being a part of the composite but as a part of the laminate primarily for tire building purposes. Representative of coverstrip thicknesses preferred are in the range of about 0.007 (0.018) about 0.2 (0.5), preferably about 0.01 (0.03) to about 0.1 (0.25), inches (cm).

The sealant composition contained in the open network is required to be tacky in nature so that it tends to adhere to a puncturing object or tends to stick to itself upon removal of a puncturing object from the tire.

In combination with the tackifying resin and black or clay, it is preferred that the sealant is comprised of (A) cis 1,4-polyisoprene rubber, natural or synthetic, and either polybutene or oil or (B) partially crosslinked butyl rubber, polyisobutylene and either polybutene or oil.

In the sealant composition, carbon black is usually used. However, depending somewhat upon the intended tire usage and other variables, clay can be used, particularly treated clay such as mercaptosilane treated clays.

Various tackifying resins can be used for the purpose of adding tack to the sealant composition. Preferably synthetic tackifying resins are used. Representative of such resins are phenol formaldehyde resins and olefin/diolefin copolymer resins. A preferred resin is a piperylene/2-methyl-2-butene resin having a softening point in the range of about 40° C. to about 105° C., preferably about 90° C. to about 100° C. according to ASTM E28-58T and prepared by polymerizing the monomers in the presence of aluminum chloride.

It is to be understood that other conventional rubber compounding ingredients can be included in the sealant composition such as antioxidants, antiozonants, coloring pigments and stabilizers except for curing agents which are not intended to be included.

Optionally, the sealant composition can contain about 2 to about 20, preferably about 5 to about 10, phr (parts by weight per 100 parts by weight rubber) of zinc oxide.

The components of the sealing composition can be mixed by conventional means and applied to the open network structure, preferably without mashing or crushing the structure so that it maintains its required open network configuration. In one embodiment the sealant composition can be first mixed with a minimal amount of solvent and applied to the structure with the aid of a doctoring device.

The practice of this invention can be further understood and illustrated by a reference to the accompanying drawings in the nature of the following examples which are intended to be represented rather than restrictive of the scope of the invention. Unless otherwise indicated all parts and percentages are by weight.

EXAMPLE 1

Figure 2:
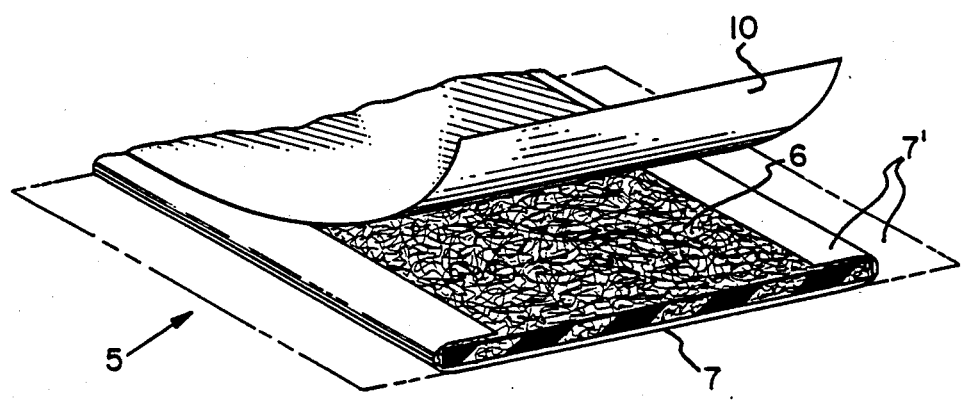

In this Example, with reference to the accompanying drawing, FIG. 1 is a side elevational view of a shaped, molded and cured pneumatic rubber tire with a cutaway portion showing an enveloped composite of open network structure containing a sealant composition on the inner surface of the tire and FIG. 2 is an enlarged view of a laminate of such composite and a coverstrip.

More specifically, an open network structure 6 in the form of an open cell natural rubber foam having an average cell size of at least about 0.05 (0.13) inch (cm) containing a sealant composition therein was applied to a rubber coverstrip 7 to form a composite 5.

A composite of the foam and sealant composition was prepared by first mixing the sealant composition with hexane solvent to form a 24% solids mixture. The open cell foam was placed on a polyurethane film and the mixture spread with a metal doctor blade on and into the open cell foam. The mixture was allowed to dry at room temperature (23° C.–25° C.) following which the rubber coverstrip was placed over the composite of foam and sealant composition with the edges of the strip extending beyond the composite.

The polyethylene film was removed from the composite with some difficulty because of the stickiness of the sealant composition and a portion of the composite and coverstrip structure was applied to a green tire so that the composite was enveloped by the tire's inner liner and the coverstrip in a manner shown in FIG. 1.

In practice, if desired, the edges of the rubber coverstrip 7' could have been optionally folded around the composite 6. For convenience in storage, a removable protective film 10 could have been applied to the exposed portion of the composite and removed before building a tire. Various films can be used such as for example, polyethylene films.

As an alternate method, the composite 6 with the coverstrip 7 could have been applied to a building drum with the coverstrip being next to the drum, and the remainder of the tire components built over the composite.

The green tire was shaped and cured under conditions of heat and pressure to form a tire 1 having a tread 2 and sidewalls 3 with filament reinforcing elements 4 and having on a relatively small part of its inner surface 8 the composite 5 covered by the coverstrip 7 with the edges of the coverstrip 7' terminating and integral and covulcanized with the tire's inner surface 8 at locations 9.

The sealant composition was prepared by mixing the components comprising the recipe shown in the following Table 1.

TABLE 1

| Component | Parts |
|---|---|
| Partially Crosslinked Butyl Rubber[1] | 100 |
| Polyisobutylene[2] | 70 |
| Carbon Black | 90 |
| Tackifying Resin[3] | 8 |
| Rubber Processing Oil | 25 |

[1]Obtained as Bucar 262 with Bucar understood to be a trademark of Polysar, Inc.
[2]Molecular weight of about 8,000–12,000.
[3]Phenol formaldehyde resin.

EXAMPLE 2

A pneumatic rubber tire is prepared according to the method of Example 1, except that the sealant composition is comprised of the recipe shown in the following Table 2 and the composite is prepared by applying the rubber foam to the rubber coverstrip and then applying the sealant composition to the open cell foam. The polyethylene film is not used. The structure is applied to a tire building drum, with the coverstrip next to the drum and the tire inner liner followed by the remainder of tire components are constructed.

TABLE 2

| Compound | Amount |
| --- | --- |
| Unvulcanized Natural Rubber[1] | 100 |
| Polybutene[2] | 200 |
| Clay[3] | 150 |
| Tackifying Resin[4] | 90 |

[1] cis 1,4-polyisoprene.
[2] Having a viscosity of 4,000 centistokes at 100° C.
[3] A mercapto-silane treated clay.
[4] A piperylene/2-methyl2-butene copolymer resin having a softening point of about 95° C. prepared by polymerizing the monomers in the presence of aluminum chloride.

In these Examples, curing does not take place in the sealant composition itself during the tire vulcanization process. Curing agents are not provided in the sealant composition for the cis1,4-polyisoprene, if used, and the butyl rubber is pre-partially crosslinked prior to mixing with the other ingredients of the sealant composition.

Curing also does not take place in the open network structure.

A reticulated foam is formed from a prepared foam which is typically close celled. Closed cell foams contain cellular structures consisting of many individual cells. The cellular structure is three-dimensionally skeletal in nature with innerconnecting strands forming the skeleton and thin membranes, or "windows", between the strands. A membrane is typically common to two adjacent cells. The membranes are removed through reticulation.

It is a particular feature of this invention that it has been discovered that the open network structure can be utilized to provide dimensional stability as a matrix for containing a sticky sealant composite for the tire.

The invention relies upon the sealant composition contained in the open network structure to seal against a puncturing object and seal the resulting leak of air from said tire to the atmosphere. The invention further relies on the network structure to support and contain the sealant composition. Therefore, the resilient composite structure is required to be a dynamic part of the tire.

The composite structure can be disposed in various inner portions of the tire where it is desired to guard against punctures. For example, it can typically extend from bead to bead for protection of both the tread and sidewall portions of the tire or, preferably, it can simply be selectively and locally disposed only inwardly of the tread portion in the crown region of the tire for protection against punctures occurring through the tread.

The tire of this invention is designed to self-seal against various puncturing objects depending somewhat upon the resiliency, thickness and internal network structure. Typically the tire can self seal punctures caused by nails and objects of various sizes. Representative of such nails are No. 4 to 6 and box and shingle nails having diameters in the range of about 0.06 to about 0.18 inches, respectively.

The liner of the tire can be of various rubbers such as natural rubber and synthetic rubber and their mixtures or blends. For example, they can be rubbery butadiene-styrene copolymers, butadiene-acrylonitrile copolymers, cis-1,4-polyisoprene, polybutadiene, isoprene-butadiene copolymers, butyl rubber, halogenated butyl rubber such as chloro or bromo butyl rubber, ethylene-propylene copolymers, ethylenepropylene terpolymers. Typically, the various rubbers are cured or vulcanized by normal curing methods and recipes such as with sulfur, or with peroxides.

While certain representative embodiments and details have been shown for the purpose of illustrating the invention, it will be apparent to those skilled in this art that various changes and modifications may be made therein without departing from the spirit or scope of the invention.

I claim:

1. A pneumatic rubber tire having a composite of open network structure containing a sealant composition adhered to the inner liner of said tire, where said composite is enveloped by the inner liner of said tire and an outer overlaying rubber coverstrip and is comprised of (A) a three-dimensional, open network of spaced apart filamentary elements in the form of a skeletal structure comprised of (i) resilient, flexible, open cell foam, or (ii) three dimensional mat of flexible organic polymer filaments which are woven or non-woven and are bonded at least 80% of their crossings and (B) a sealant composition contained in said skeletal structure, where said coverstrip covers the outer surface of said composite, is folded around its edges to cover its two edges and a portion of the opposing surface of the composite and is integral, covulcanized and terminate with said tire inner liner; wherein said open cell foam is composed of a flexible, resilient material selected from at least one of natural rubber, synthetic rubber and polyurethane; where the filaments of said mat are composed of a flexible organic thermoset polymer or a thermoplastic polymer having a softening point of at least 200° C.; and where said sealant composite is a tacky composition comprised of (i) about 100 parts by weight of a rubber selected from uncured cis 1,4-polyisoprene rubber or partially cross-linked butyl rubber, (ii) about 40 to about 300 phr of fluid polymeric material selected from at least one of rubber processing oil and polybutene having a viscosity in the range of about 25 to about 5000 centistokes at 100° C., (iii) when (i) is butyl rubber, about 40 to about 300 phr of polyisobutylene having a viscosity average weight in the range of about 8000 to about 135,000 (Staudinger), (iv) about 40 to about 140 phr of at least one of the group consisting of particulate carbon black and clay and (v) about 40 to about 120 phr of a tackifying resin.

2. The pneumatic tire of claim 1 is provided having two spaced inextensible beads, a tread portion, a pair of individual sidewalls extending radially inward from the axial outer edges of said tread portion to join the respective beads, a supporting structure for said tread portion and said enveloped composite substrate adhered to and disposed inwardly of said supporting structure in the crown region of the tire.

3. The tire of claim 2 where, in said foam, at least about 70% of its cells are open and having average diameter in the range of about 0.13 to about 0.6 cm and where said foam material is selected from at least one of natural rubber and synthetic rubber.

4. The tire of claim 2 where said network (A) is the three-dimensional mat (A-ii) and is composed of polymer filaments selected from at least one of polyester, nylon and aramid filaments.

5. The tire of claim 2 where said coverstrip, in its cured state, has an ultimate elongation of at least 500% and is composed of at least one rubber selected from natural rubber and synthetic rubbers such as cis 1,4 polyisoprene, cis 1,4-polybutadiene, styrene/butadiene copolymer, butyl rubber, chlorobutyl rubber, bromobutyl rubber, EPDM (ethylene/propylene/conjugated diene terpolymer) and styrene/butadiene/styrene block copolymer.

6. The tire of claim 2 where said sealant composition is composed of said tackifying resin, at least one of carbon black or clay, cis 1,4-polyisoprene rubber and at least one of said polybutene and oil.

7. The of claim 2 where said sealant composition is comprised of said tackifying resin, at least one of said carbon black or clay, partially cross-linked butyl rubber, polyisobutelene and at least one of polybutene and oil.

8. The tire of claim 7 where said clay is a mercapto-silane treated clay.

9. The tire of claim 7 where said tackifying resin is a piperylene/2-methyl-2-butene resin having a softening point in the range of about 90° C. to about 100° C.

10. The tire of claim 9 where said sealant composition also contains about 2 to about 20 phr of zinc oxide.

11. The tire of claim 1 where the said coverstrip, in its cured state, has an ultimate elongation of at least 500%; where, in said foam, at least about 70% of its cells are open and having average diameter in the range of about 0.13 to about 0.6 cm and where said foam material is selected from at least one of natural rubber and synthetic rubber; where said mat is composed of polymer filaments selected from at least one of polyester nylon and aramid filaments; where said sealant composition is composed of said tackifying resin, at least one of carbon black or clay, and either (A) 1,4-polyisoprene rubber and at least one of said polybutene and oil or (B) partially cross-linked butyl rubber, polyisobutelene and at least one of polybutene and oil; where, in said sealant, said clay is a mercapto-silane treated clay; and where, in said sealant, said tackifying resin is a piperylene/2-methyl-2-butene resin having a softening point in the range of about 90° C. to about 100° C.

12. The tire of claim 11 where said sealant composition also contains about 2 to about 20 phr of zinc oxide.

* * * * *